United States Patent
Goussin et al.

(10) Patent No.: US 12,321,548 B2
(45) Date of Patent: Jun. 3, 2025

(54) TOUGH PANEL LOCATION DETECTION WITH DIFFERENT FREQUENCY-PHASE OFFSET COMBINATIONS OF ELECTRODE SIGNALS

(71) Applicant: NXP B.V., Eindhoven (NL)

(72) Inventors: Franck Goussin, Blainville sur Orne (FR); Frederic Darthenay, Luc sur Mer (FR); Jean-Robert Tourret, Cormelles le Royal (FR); Vincent Geffroy, Cuverville (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/587,195

(22) Filed: Feb. 26, 2024

(65) Prior Publication Data

US 2024/0302918 A1    Sep. 12, 2024

(30) Foreign Application Priority Data

Mar. 7, 2023    (EP) .................................... 23305301

(51) Int. Cl.
  *G06F 3/041*    (2006.01)
  *G06F 3/044*    (2006.01)

(52) U.S. Cl.
  CPC ........ *G06F 3/04166* (2019.05); *G06F 3/0446* (2019.05)

(58) Field of Classification Search
  None
  See application file for complete search history.

(56) References Cited

U.S. PATENT DOCUMENTS

| | | | |
|---|---|---|---|
| 9,606,663 B2 | 3/2017 | Yousefpor et al. | |
| 9,678,609 B2 * | 6/2017 | Yao | G06F 3/0446 |
| 10,558,293 B2 * | 2/2020 | Wigdor | G06F 3/0421 |
| 10,969,917 B2 | 4/2021 | Krah et al. | |
| 2014/0327644 A1 | 11/2014 | Mohindra | |
| 2015/0109212 A1 | 4/2015 | Yao et al. | |
| 2019/0102010 A1 * | 4/2019 | Knabenshue | G06F 3/0442 |
| 2022/0382451 A1 | 12/2022 | Bihday et al. | |
| 2024/0019957 A1 * | 1/2024 | Hu | G06F 3/0416 |

OTHER PUBLICATIONS

U.S. Appl. No. 18/664,150, Darthenay et al., "Capacitive Touch Screens," filed May 14, 2024.
U.S. Appl. No. 18/595,499, Darthenay et al., "Touch Panel System Using Modulated Signals as Drive Signals," filed Mar. 5, 2024.
U.S. Appl. No. 18/675,524, Raschbacher et al., Test Methods for Capacitive Touch Screens, and Capacitive Touch Screen Assemblies, filed May 28, 2024.

* cited by examiner

*Primary Examiner* — Matthew Yeung
(74) *Attorney, Agent, or Firm* — David G. Dolezal

(57) ABSTRACT

A touch panel system that includes drivers for providing detection signals on a first plurality of electrodes of a touch panel where each detection signal includes one or more frequency signal components with each frequency signal component having a frequency and a phase offset. The detection signals includes at least three phase offsets for at least one frequency of the frequency signal components. Each detection signal has a unique frequency-phase offset combination of the one or more frequency signal components. The unique combinations allow for the determination of a touch at specific locations on the panel by sensing signals on a second set of electrodes.

20 Claims, 7 Drawing Sheets

TOUGH PANEL LOCATION DETECTION WITH DIFFERENT FREQUENCY-PHASE OFFSET COMBINATIONS OF ELECTRODE SIGNALS

CROSS-REFERENCE TO RELATED APPLICATIONS

This application claims the priority under 35 U.S.C. § 119 of European Patent application no. 23305301.6, filed on 7 Mar. 2023, the contents of which are incorporated by reference herein.

BACKGROUND OF THE INVENTION

Field of the Invention

This invention relates to touch location detection on a touch panel using detection signals with different phase and frequency combinations.

Background

Some capacitive touch panels utilized internal electrodes for providing an indication of a touch location on the panel based on detection signals provided and sensed on the electrodes of a touch panel.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Disclosed herein is a touch panel system that includes drivers for providing detection signals on a first plurality of electrodes of a touch panel where each detection signal includes one or more frequency signal components with each frequency signal component having a frequency and a phase offset. The detection signals includes at least three phase offsets for at least one frequency of the frequency signal components. Each detection signal has a unique frequency-phase offset combination of the one or more frequency signal components. The unique combinations allow for the determination of a touch at specific locations on the panel by sensing signals on a second set of electrodes.

Utilizing detection signals with unique frequency-phase offset combinations may allow for a touch panel system to utilize a smaller number of detection signal frequencies for touch location detection.

Figure 1:
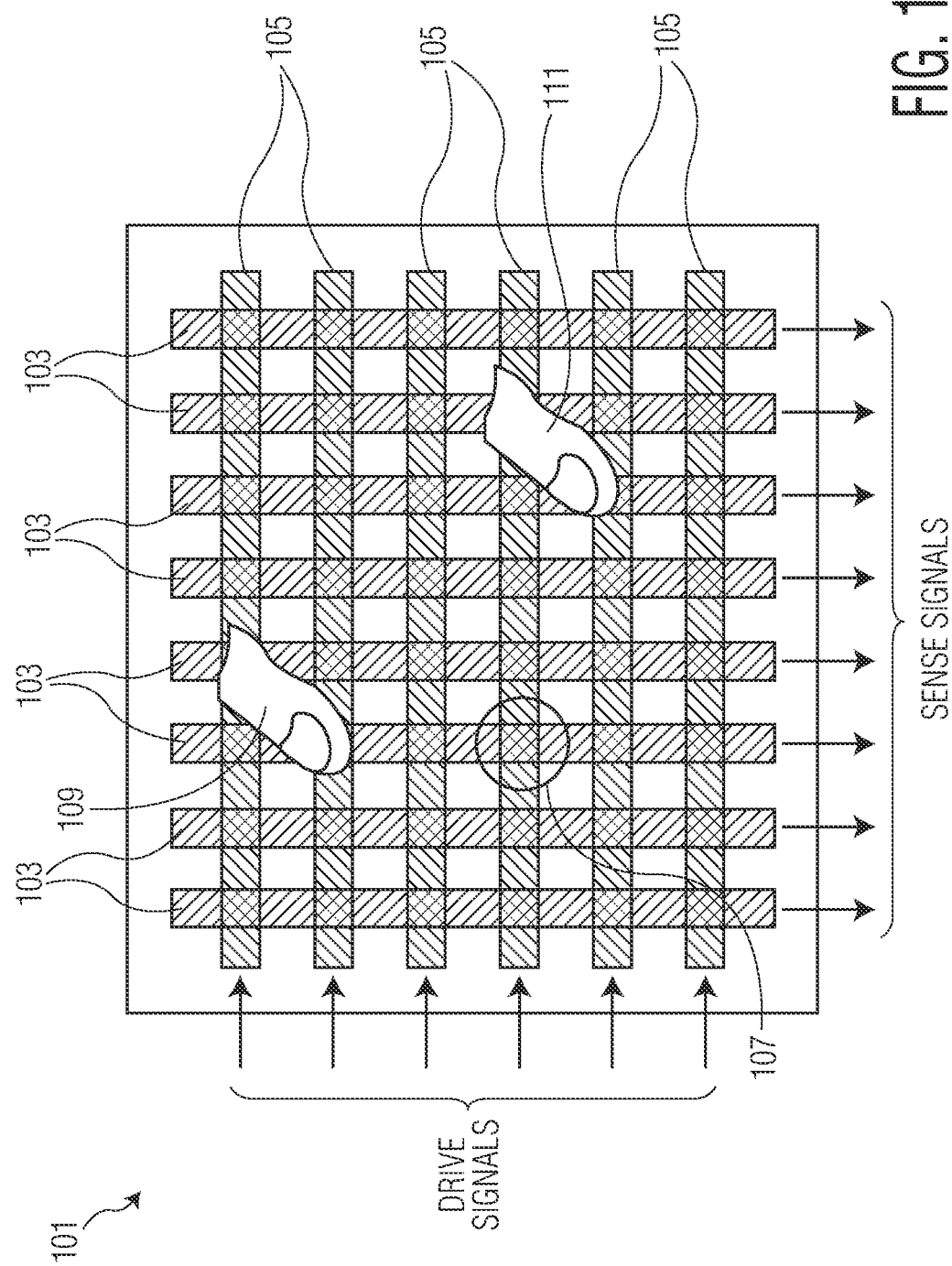
FIG. 1 is a top view of a touch panel.

FIG. 1 shows a top view of a touch panel 101 with fingers 109 and 111 touching different locations on panel 101. Panel 101 includes "row" electrodes 105 located in a horizontal orientation relative to the view of FIG. 1 and "column" electrodes 103 located in a vertical orientation relative to the view of FIG. 1. During a touch location detection mode of operation, detection signals are applied to electrodes 105 which generate resulting sense signals on electrodes 103 that are sensed to determine the touch location of fingers 109 and 111 on panel 101. By detecting specific changes in the sense signals on electrodes 103, a determination can be made of whether a finger is touching (or is in close proximately to) panel 101 for activating an action designated to be performed as a result of the touch at the specific location.

Each sense signal on a column electrode of electrodes 103 is affected by the detection signals of the row electrodes 105 that intersect with the column electrode. A touch by a finger (or other object such as a stylus) at a location where a row electrode intersects with a column electrode will alter the sense signal of the column electrode. As used herein, a "crosspoint" is a location on a panel located at an intersection of two electrodes where a touch event alters the effect of a detection signal of one of the electrodes on the sense signal of the other electrode. The location of the touch can be determined by how the sense signal is altered due to the touch.

Figure 3:
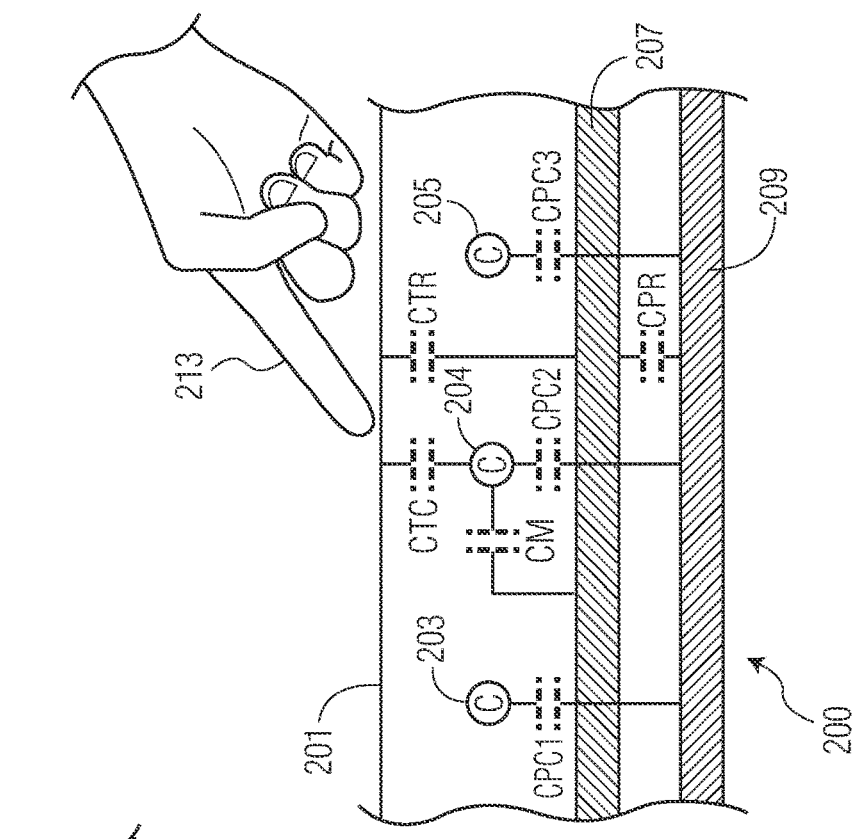
FIGS. 2 and 3 are partial cutaway side views of a touch panel illustrating the change in capacitance due to a finger in proximity to a crosspoint of a panel.
Figure 2:
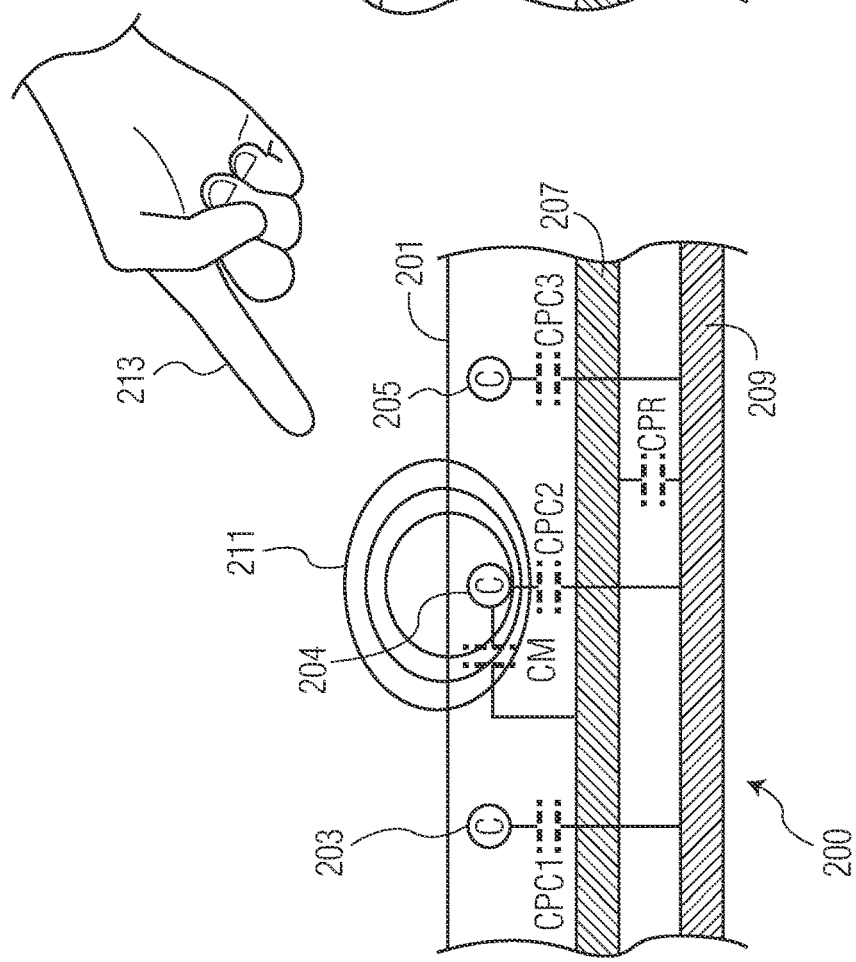

FIGS. 2 and 3 are partial cut away side views of a touch panel 200 showing how an object touching the panel can affect the capacitance of the electrodes of the panel. In FIGS. 2 and 3, panel 200 includes "column" electrodes 203-205 that are located in one layer of the panel (orientated into and out of the page in the views of FIGS. 2 and 3). A "row" electrode 207 is located below column electrodes 203-205 and runs in a perpendicular orientation to the column electrodes. The row and column electrodes are located below a layer of glass 201. A ground plane 209 is located below row electrode 207. Dielectric material (not shown) physically separates the electrodes and ground plane 209.

As shown in FIG. 2, finger 213 is located away from panel 200 such that finger 213 does not perturb the electrical field lines 211 that surround the mutual capacitance (represented by capacitor symbol CM) between electrode 204 and electrode 207 that occurs where electrode 204 intersects electrode 207. Capacitor symbol CPC1 represents the capacitance between electrode 203 and ground plane 209. Capacitor symbol CPC2 represents the capacitance between electrode 204 and ground plane 209, and capacitor symbol CPC3 represents the capacitance between electrode 205 and ground plane 209. Capacitance CPR represents the capacitance between row electrode 207 and ground plane 209.

FIG. 3 shows finger 213 in contact with glass 201 at the intersection of electrode 204 and electrode 207. Because finger 213 can be considered a ground, a capacitance (represented by capacitor symbol CTR) is formed between finger 213 and row electrode 207 and a capacitance (represented by capacitor symbol CTC) is formed between finger 213 and column electrode 204. These capacitances (CTR and CTC) are in parallel with capacitances CPR and CPC2, respectfully, and therefore increase the bulk capacitances of electrodes 204 and 207.

Because finger 213's touch of glass 201 perturbs the electric field lines 211 of the mutual capacitance CM between electrodes 204 and 207, the outer electric field loops of the electric field lines 211 break where part of the electric field is directed towards the approaching finger, thereby decreasing the electric field strength between the column electrode and row electrode. The decreasing electric field strength decreases the mutual capacitance CM between column electrode 204 and row electrode 207. The decrease in the mutual capacitance between a column electrode 204 and a row electrode 207 during a touch location detection mode reduces the effect of row's 207 detection signal on the sense signal of electrode 204. The amount of decrease in the mutual capacitance depends upon the closeness of a finger to the crosspoint.

Accordingly, by detecting a reduction in amplitude in the sense signal of a sense electrode (204) at a frequency corresponding to the frequency of the detection signal on a drive electrode (207) intersecting the sense electrode during a touch location detection mode, a determination can be made as to whether a touch event happened at the crosspoint of the two electrodes (204 and 207).

With such a touch panel configuration, the number of unique detection signal frequencies needed is dependent upon the number of electrodes in which detection signals are provided (e.g., the number of rows in FIG. 1). In some examples, in order to accommodate the digital filtering and frame rate of a touch panel system, the spacing between two consecutive detection signal frequencies is aligned to the frame refresh rate (e.g., 300 Hz). Accordingly, the total bandwidth needed for detection signals for touch panel location detection is 300 Hz times the number of drive electrodes (e.g., the number of rows in the touch panel of FIG. 1).

With large touch panel applications, the number of electrodes on which detection signals are applied (e.g., the row electrodes in FIG. 1) is relatively large and possibly does not match the intrinsic frequency response of the panel. Furthermore, the cumulative number of column electrodes affects the voltage amplitude response of the panel and therefore the panel's operable bandwidth, which limits the number of possible detection signal frequencies that can be used. For accurate touch location detection, the number of frequencies available is limited to a workable frequency range where the signal to noise ratio (SNR) of the sense signals is greater than a minimum SNR threshold. As the size of a panel increases, the increase in bulk row capacitance and resistance, bulk column capacitance and resistance, and bulk mutual capacitance act to reduce the workable frequency range and further reduce the number of detection signal frequencies available.

Figure 4:
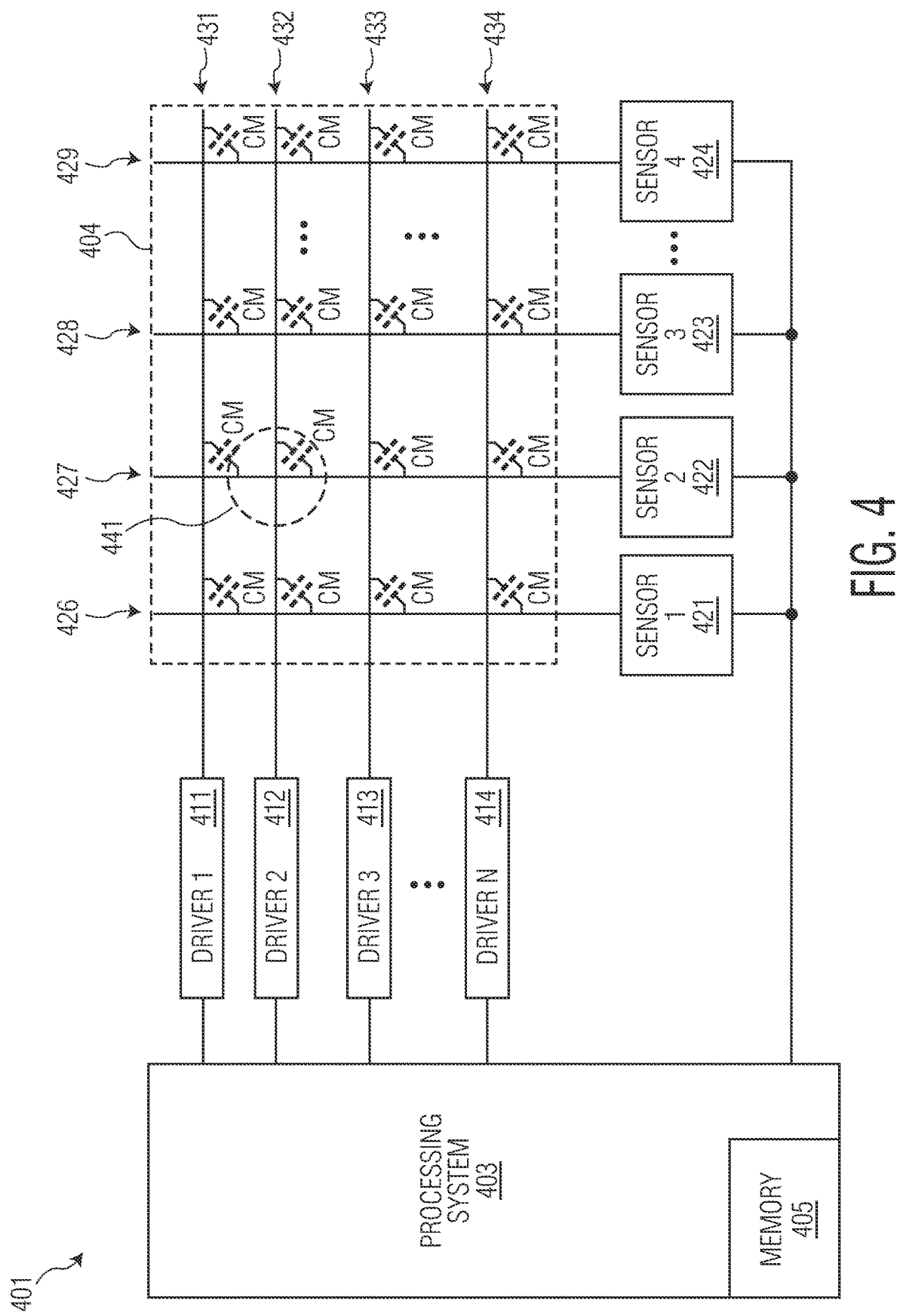
FIG. 4 is a block diagram of a touch panel system according to one embodiment of the present invention.

FIG. 4 is a block diagram of a touch panel system 401 that utilizes drive detection signals with unique frequency-phase offset combinations for touch location detection. System 401 includes a touch panel 404 with row electrodes (431-434) and column electrodes (426-429) which are located in different layers of the panel and are oriented orthogonally with respect to each other. In one embodiment, the row and column electrodes are formed from a transparent conductive material such as indium tin oxide or antimony tin oxide, although in other embodiments, the electrodes may be formed of other transparent conductive materials or non transparent conductive materials (e.g., copper).

In one embodiment, electrodes 426-429 and electrodes 431-434 are located on top of a controllable display device (e.g., LED display or OLED display—not shown) embedded in panel 404 such that images may be displayed on panel 404 to a user. In addition to displaying information, such images may direct a user to touch certain locations of the screen to initiate specific actions. For example, system 401 may be implemented as a control panel in a vehicle, where panel 404 would display "buttons" that when activated, initiate climate control, infotainment, or vehicle control actions for the vehicle. In other embodiments, panel 404 may display a map where a user can touch one or more locations simultaneously to adjust the scale of the map or to change other features of the map. In another embodiment, panel 404 would display alpha-numeric characters that a user would push to enter information or communicate data. However, touch panel system 401 may be used in other applications such as entertainment, communications, graphical interface, or for system control. In some embodiments, panel 404 may include a "fixed" background where the information displayed behind the panel does not change.

In the embodiment shown, row electrodes 431-434 and column electrodes 426-429 intersect at crosspoints (e.g., 441) where a row electrode and a column electrode have a mutual capacitance (CM) with each other such that changes in the mutual capacitance can be used to determine that a touch has occurred at that location. However, touch detection at a crosspoint of a panel may be implemented by different techniques and/or different configurations in other embodiments. For example, in some embodiments, the electrodes may have a different arrangement, (e.g., diagonally, in circles, in different layers, or at different intersecting orientations with respect to each other) to provide crosspoints for location detection. In some embodiments, location detection may be performed by detecting changes in self-capacitance of the electrodes. Although panel 404 is shown as having four row electrodes (431-434) and four column electrodes (426-429), a touch panel may include a different number of row electrodes and/or a different number of column electrodes (e.g., 32, 64, 128, 512) in other embodiments.

System 401 includes drivers 411-414, each for generating and providing a detection signal on a respective row electrode (431-434). In one embodiment, drivers 411-414 include both analog and digital circuitry. Details of an embodiment of a driver are described later with respect to FIG. 7.

System 401 includes sensors 421-424, each for sensing a current on a respective column electrode (426-429) during a touch location detection mode. In one embodiment, sensors 421-424 are able to detect amplitudes and phase offsets at different frequencies. Such information can be used by processing system 403 to determine changes in the sensor current due to a touch event at one or more crosspoints located along the column electrode. In one embodiment, sensors 421-424 include both analog and digital circuitry. Details of an embodiment of a sensor are described later with respect to FIG. 7.

System 401 includes a processing system 403 that includes one or more processor cores (not shown) which execute code for controlling the operations of system 401. System 403 includes a memory 405 for storing executable code and for storing working data produced from the operations of panel system 401. In some embodiments, system 403 utilizes the amplitude and phase offset data from sensors 421-424 to identify touch events at crosspoints of panel 404. In one embodiment, system 403 initiates changes to information displayed on panel 404 (e.g., adjusts a displayed map, changes option screens) based on the touch location data. In other embodiments, system 403 provides the touch location data to other systems (e.g., climate controller, motor controllers, communications devices-none shown) to initiate actions based on the touch location. In some embodiments, processing system 403 is part of the system controller (e.g., for an appliance). In other embodiments, system 403 may communicate with a system controller of a system that implements touch panel system 401.

System 401 may include other devices not shown in FIG. 4. For example, in one embodiment, system 401 includes a second plurality of drivers (not shown) for driving signals on column electrodes 426-429 and a second plurality of sensors (not shown) for sensing signals on row electrodes 431-434. These drivers and sensors are used in providing a common frequency (FSELF) signal to all row and column electrodes for detecting a change in self-capacitance of the electrodes due to a touch. They may also be used to detect the presence of water or other substances on the touch panel. Changes in self-capacitance of the electrodes can be used to detect if an electrode has been touched. However, in the event of multiple touches, such self-capacitance measurements may not be able to identify the exact crosspoints that have been touched e.g., due to ghost touches. In addition, system 401 may include other devices such as power supplies, clocks, and LCD or OLED drivers (none shown) for controlling the display of information on panel 404.

System 401 may include other circuitry, perform other functions, and/or be arranged in other configurations in other embodiments. For example, in some embodiments, drivers 411-414 may drive the detection signals on column electrodes 426-429 and sensors 421-424 may sense current of row electrodes 431-434.

Figure 5:
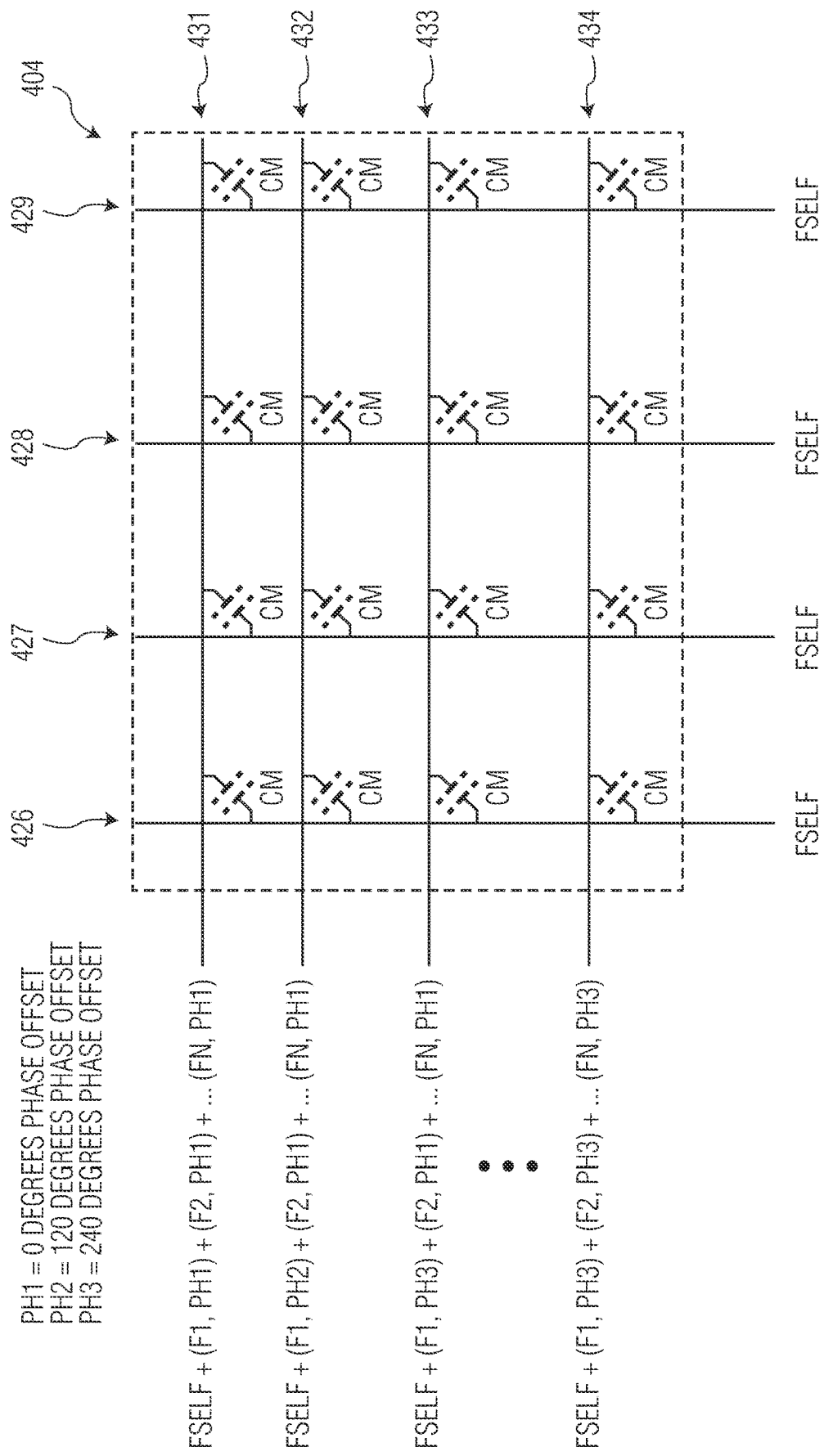
FIG. 5 is a diagram illustrating signals being applied to electrodes of a touch panel according to one embodiment of the present invention.

FIG. 5 illustrates the frequencies and phase offsets of detection signals that may be applied to the row and column electrodes of panel 404 during a touch location detection mode according to one embodiment of the present invention. In the embodiment shown, a common frequency signal component at frequency FSELF is applied to both the row electrodes 431-434 and column electrodes 426-429. This common frequency signal component is used to determine whether there is a change in self-capacitance on an electrode to determine if the panel has been touched at the location of the electrode. It can also be used to determine if there is water on the panel. In one embodiment, common frequency signal component has a 0 degree phase offset and is driven on electrodes 431-434 by drivers 411-414 and is driven on electrodes 426-429 by other drivers (not shown in FIG. 4). In one embodiment, the common frequency signal is 9.9 KHz, but may be at other frequencies and other phase offsets in other embodiments.

FIG. 5 shows that additional frequency signal components are applied to each row electrode 431-434. The additional frequency signal components applied to each row electrode have a frequency of F1, F2, and FN, respectively, wherein N is an integer of 3 or greater. Although some embodiments only 1 or 2 additional frequency component frequencies may be applied. For example, see table 601 of FIG. 6 for an embodiment that includes only additional two frequency components. In one embodiment, the frequencies of the additional frequency signal components are separated by 300 HZ from each other. For example, where FSELF is 9.9 KHz, F1 is 10.2 KHz, F2 is 10.5 KHz, and FN is 9.9+N* (0.3) KHz. However, these frequency offsets may be at other values in other embodiments.

In the embodiment shown, the frequency-phase offset combination of the additional frequency signal components applied to each row electrode are unique among the row electrodes. In an example where N is 3, the three frequency signal components at frequencies F1, F2, and FN (indicated by "F1, PH1," F2, PH1," and "FN, PH1" in FIG. 5) that are applied to electrode 431 all have a phase offset of 0 degrees (indicated by "PH1" in FIG. 5). The three frequency signal components (indicated by "F1, PH2," F2, PH1," and "FN, PH1" in FIG. 5) applied to electrode 432 have phase offsets of 120 degrees (as indicated by "PH2" in FIG. 5), 0 degrees, and 0 degrees, respectively. The three frequency signal components (indicated by "F1, PH3," F2, PH1," and "FN, PH1" in FIG. 5) applied to electrode 433 have phase offsets of 240 degrees (as indicated by "PH3" in FIG. 5), 0 degrees, and 0 degrees, respectively. The three frequency signal components (indicated by "F1, PH3," F2, PH3," and "FN, PH3" in FIG. 5) applied to electrode 434 have phase offsets of 240 degrees, 240 degrees, and 240 degrees, respectively. In one embodiment, these frequency signal components are signal tones having a sinusoidal wave form at the listed frequency and having the listed phase offset. However, the frequency signal components may have other forms in other embodiments. For example, in some embodiments, the tones may include distortions or harmonics that may be filtered out in postprocessing.

In one embodiment, the total number of frequency signal components at a frequency (F1) having a 0 degree phase offset (PH1) applied to the row electrodes of a panel is equal to the total number of frequency signal components at the frequency (F1) having a 120 degree phase offset (PH2) applied to the row electrodes and equal to the total number of frequency signal components at the frequency (F1) having a 240 degree phase offset (PH3) applied to the row electrodes. See for example table 603 of FIG. 6. With such a balanced configuration, the current sensed on any column electrode (426-429) in response to a no touch condition will have a zero amplitude (or minimal amplitude below a touch amplitude threshold) at the frequencies (F1) during a touch location detection mode.

In such as balanced configuration, a touch of a panel at one or more crosspoints will generate a summed vector above a threshold amplitude and with a resultant phase offset in the sensed signal at the column at the one or more frequencies of the one or more frequency components. The formation of the summed vector at a frequency is due to the reduction in mutual capacitance from the one or more touches at the crosspoints of the column electrode which causes an imbalance in the total magnitude of the detection signals at each phase offset at the frequency.

For a single touch of a detectable strength, the summed vector at the frequency will have a phase offset angle that is the average of the remaining phase offsets (e.g., the two remaining phase offsets in the three frequency (F1, F2, and FN) embodiment of FIG. 5) of the frequencies that were not affected by the touch. For example, in FIG. 5, if the crosspoint at electrode 426 and electrode 431 were touched, a vector at frequency F1 would form in the sense signal at electrode 426. The vector would have a resultant phase offset of 180 degrees (the average phase offset (PH2+PH3)/2) between phase offsets PH2 and PH3) in that the F1, PH1 (0 degree) frequency signal component was reduced at the crosspoint of electrodes 426 and 431 due to the reduction of mutual capacitance (CM) as a result of the touch. The strength of the touch (e.g., the distance of a finger to a touch panel) determines the mutual capacitance variation, and therefore, the amplitude of the vector formed at the 180 degree phase offset. If the cross point at electrode 426 and electrode 434 were touched, a vector at frequency F1 would form on the sense signal at electrode 426 with a phase offset of 60 degrees (the average between PH1 and PH2) in that the amplitude of the F1, PH3 (240 degrees) signal component was reduced at the crosspoint.

If multiple crosspoints are touched (at a detectable strength) where two frequency signal components at a frequency with the same phase offsets were affected, then the summed vector formed on a column electrode would have a greater amplitude than if only one frequency signal component were affected, assuming that the touches in both cases have a similar strength. For example, if the location at the crosspoint of electrodes 431 and 426 was touched and the location at the crosspoint of electrodes 432 and 426 were touched, the frequency component signal F2, PH1 applied to both electrodes 431 and 432 would be reduced where a resultant vector would form in the sense signal of electrode 426 at frequency F2 with a phase offset of 300 degrees, the average of PH1 (0 (or 360) degrees) and PH3 (240 degrees).

For other multiple touch conditions, the phase offset angle and the magnitude of the amplitude of the summed vector at a frequency that forms will depend upon the number of rows with a frequency signal component at each phase offset of the frequency that is not touched, the number of rows with a frequency signal component at each phase offset of the frequency that are touched, and the strength of those touches. Accordingly for each frequency, a touch of a panel will generate a resultant summed vector having an amplitude and phase offset of the sensed signal at that frequency.

One formula for calculating the resultant amplitude and phase offset of the summed vector at a frequency for a three phase offset system (F1, F2, and F3), where an equal number of frequency signal components for each phase offset (PH1, PH2, and PH3) for the frequency are applied to the row electrodes, is as follows:

$$1/2 * (2k1 - k2 - k3 + (j * sqrt(3)) * (k2 - k3));  \quad (EQ. 1)$$

Where k1, k2 and k3 are the amplitude loss, in %, of the sum total of all signal components at each of the three phase offsets (e.g., at 0, 120 and 240 degrees) respectively, and j is the square root of −1.

In one example of applying the formula, where the crosspoints receiving the signal components with a 0 degree phase offset of a frequency are untouched, the total sum of the amplitudes of signal components with the 120 degree phase offset of the frequency are reduced by 20% (due to a reduction in the mutual capacitances of the touched crosspoints receiving those signal components), and the total sum of the amplitudes of signal components with the 240 degree phase offset of the frequency are reduced by 80%, the resulting summed vector at the frequency would have an offset of 46 degrees.

The equation can be generalized to a N-phase system, where the N-phase phases are preferably (but not necessarily) uniformly distributed over 360 degrees. However, other formulas or methods may be used to calculate the amplitude and phase offset of a frequency of a sensed signal.

Accordingly, by measuring on a sense electrode, the amplitudes and phase offsets of the summed vectors at each of the frequencies of the frequency signal components, a determination can be made as to which crosspoints of the column electrodes were touched. In some embodiments, this determination can be made even if the phase offsets of the total frequency signal components applied to the rows are not balanced.

Although FIG. 5 shows only three phase offsets being utilized, other embodiments may utilize a different number of phase offsets (e.g., 2, 4, 5, 7, 9) for the frequency signal components. Also in some embodiments, the amplitudes of the frequency signal components at each phase offset of a frequency may not be balanced, where a summed vector at a phase offset would be formed for each frequency on a sensed signal in response to a no touch condition on the electrode of the sensed signal. Further in some embodiments, each frequency may utilize a different number of phase offset. Also in some embodiments, different amplitudes of the detection signal may be applied to different rows.

One advantage of providing a system with an odd number of phase offsets (with three shown in FIG. 5-PH1, PH2, and PHN) for the frequency signal components that are applied to the drive electrodes (e.g., the row electrodes in FIG. 5) of a panel is that the phase offset of the summed vector will less likely be at a phase offset of a frequency signal component. For example, in a 4 phase offset system where the phase offsets are 0 degrees, 90 degrees, 180 degrees, and 270 degrees, a touch at one location (e.g., at a cross point receiving a 0 degree phase offset signal component) will produce a summed vector having one of the other phase offsets (e.g., at 180 degrees) of the detection signal frequency signal components. Also, some touch combinations would have the same summed vector phase offset as other touch combinations. Such a property may make location detection more difficult.

However, in some embodiments with an even number of phase offsets (e.g., 4, 8), the phase offsets of the frequency component signals may not be uniformly separated. For example, for a 4 phase system, the phase offsets may be at 0 degrees, 85 degrees, 185 degrees, and 265 degrees. Accordingly, with such a distribution, a touch at one crosspoint will not generate a summed vector at a phase offset of the other frequency component signals.

Figure 6:
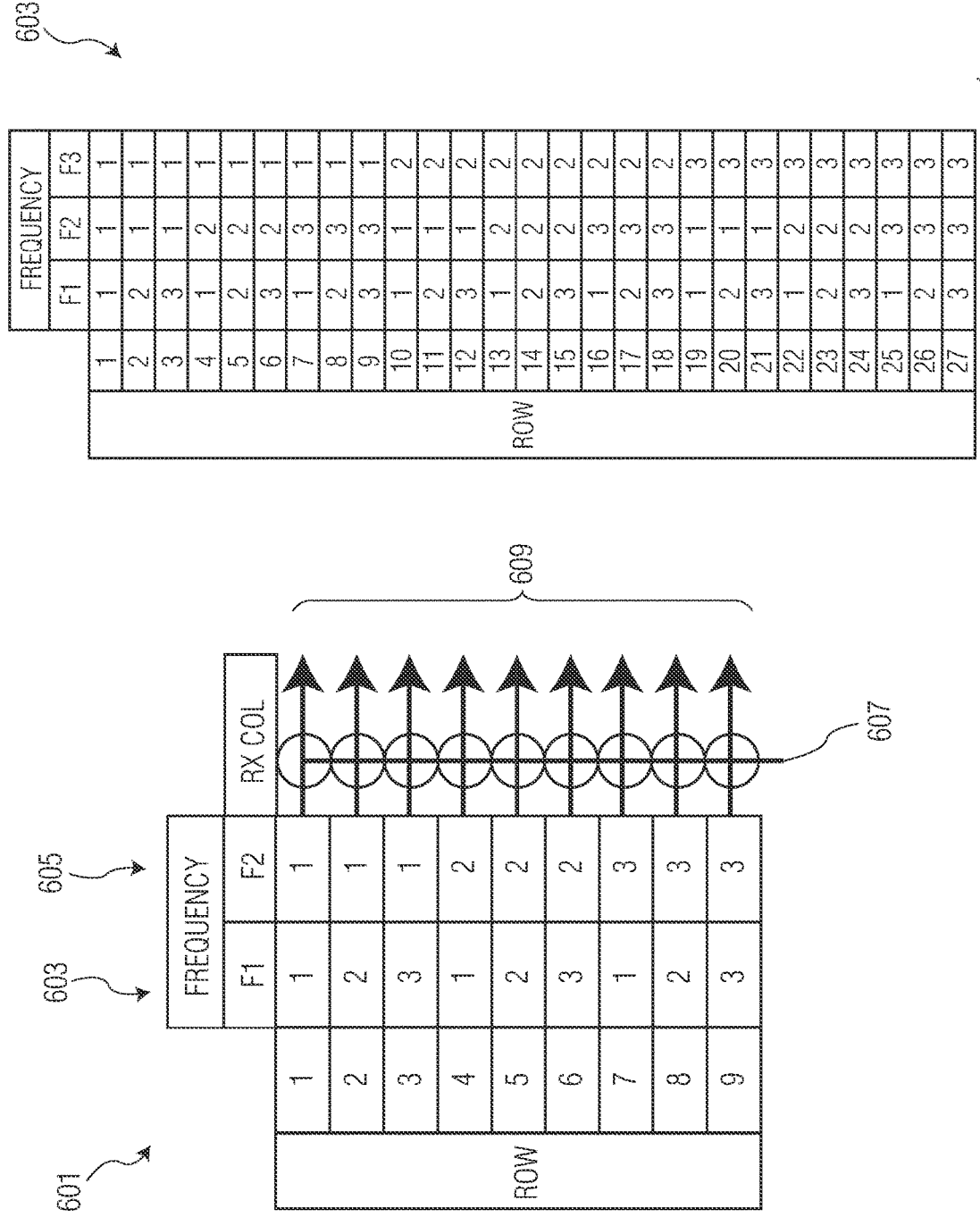
FIG. 6 shows tables illustrating frequency-phase offset combinations of signals that can be applied to electrodes of a touch panel according to one embodiment of the present invention.

FIG. 6 shows two tables setting forth possible frequency-phase offset combinations for frequency signal components applied to row electrodes (which of the drive electrodes in the embodiment shown). In table 601, two frequency component signals at two different frequencies (F1, F2) are applied to each row electrode where each frequency component signal can have one of three phase offsets (1=0 degrees phase offset, 2=120 degrees phase offset and 3=240 degrees phase offset). For example, the signal applied to row three includes a signal component at frequency F1 with a phase offset "3" of 240 degrees and a component signal at frequency F2 with a phase offset "1" of 0 degrees. The number of possible unique frequency-phase offset combinations is the number of phase offsets to the power of the number of frequencies ((# of phase offsets) $^{(\# \text{ of frequencies})}$), or $3^2$ = 9 in the case of table 601.

However, in some embodiments, if applying all possible frequency signal component combinations, ambiguities in touch location detection may exist. For example, in the case where rows 1, 5, and 9 are simultaneously touched, the amplitudes of the sense signal on column electrode 607 would be the same as a no touch conditions. Thus, if all possible combinations were utilized, there would be ambiguity as to whether there was a "no touch condition" or whether rows 1, 5, and 9 were touched. Because of such ambiguities, in one embodiment, the number of usable frequency-phase offset combinations may be limited to (# of phases)$^{(\text{\# of frequencies})}*((\text{\# of phases})-1)/(\text{\# of phases})$. Accordingly, for the 2 frequency, 3 phase offset system of table 601, 6 of the 9 possible combinations would be usable without ambiguity, in some embodiments. For a 2 frequency, 5 phase offset system, 20 combinations of the 25 possible combinations would be usable without ambiguity. For a single frequency, 11 phase offset combination, 10 of the 11 possible combinations would be usable without ambiguity.

Table 603 shows a maximum number of frequency-phase offset combinations for the case where three frequency signal components at three different frequencies (F1, F2, and F3) and three different phase offsets (1=0 degrees offset, 2=120 degrees offset and 3=240 degrees offset) can be applied to the row electrodes of a panel where each frequency-phase offset combination is unique. As shown in table 603, there are 27 possible frequency-phase offset combinations. However, as explained above, not all possible combinations may be usable due to ambiguities in some embodiments. In some embodiments, using the formula (# of phases)$^{(\text{\# of frequencies})}*((\text{\# of phases})-1)/(\text{\# of phases})$, 18 out of 27 of the combinations would be usable.

In some of these embodiments, some unused combinations would be applied to "dummy" rows (not shown) that intersect the column electrodes (e.g., 607) at dummy crosspoints (not shown) that cannot be touched so as to maintain a "no amplitude" balanced condition of the frequencies when there is a no touch condition. Also in some embodiments, self-capacitance measurements from the common frequency (FSELF) signal component applied to the electrodes could be used to distinguish between some ambiguous conditions. For example, self-capacitance measurements could be used to distinguish between a no touch condition and a condition where rows 1, 5, and 9 of table 601 are simultaneously touched. Thus, in some embodiments, the ratio of usable combinations to total combination may be different.

In other embodiments, a greater number of frequencies may be used to provide more robustness and redundancy for touch location detection. For example, for the 3 frequency, 3 phase system where 18 out of the possible 27 combinations are usable, a fourth frequency component signal could be added to increase the accuracy of the system. In other embodiments, not all frequencies would be provided to all the rows. In an embodiment utilizing four frequencies of frequency component signals, row electrodes 1-6 may be provided with phase offset combinations of frequency signals F1 and F2 and row electrodes 7-12 may be provided with phase offset combinations of frequency signals F3 and F4. In another embodiment, row electrodes 1-6 may be provided with phase offset combinations of frequency signals F1 and F2, rows electrodes 7-12 may be provided with phase offset combinations of frequency signals F1 and F3, and row electrodes 13-18 may be provided with phase offset combinations of frequency signals F2 and F4. Also, the frequency-phase offset combinations applied to the rows may be arranged differently in other embodiments. In some embodiments, less than all of the possible frequency-phase offset combinations may be used.

In some embodiments, the choice of the number of phase offsets and frequencies utilized for touch location is guided by the maximum possible number of simultaneous touches on a column. Increasing the number of phase offsets and/or or frequencies of a system provides for an increased number of simultaneous crosspoint touch capability. However, the number of phase offsets utilized and the number of frequencies utilized may be subject to constraints. For example, increasing the number of frequencies per row electrode may make the peak to average ratio of the detection signal larger. Thus, the amplitude for each frequency signal component may need to be reduced to prevent saturation and the generation of undesirable frequencies. Increasing the number of phase offsets in some embodiments may make it more difficult to detect changes in a sense signal, as the sense signals may be more prone to noise. However, in some embodiments, utilizing a balanced system where the amplitude of a summed vector in a no touch condition is minimized (e.g., at or near a no amplitude condition) may provide for a system with reduced noise on the sense electrodes, enabling an improved touch location detection. In some embodiments, the number of frequency and phase offsets utilized may depend on the panel size, panel type, electrode size and material, and the circuitry utilized for touch panel detection.

In some embodiments, a three phase offset system may provide for a desirable balance in meeting constraints by providing an increased number of frequency-phase offset combinations while reducing the complexity of detection due to reduced noise on a sense electrode. A three phase offset system also utilizes an odd number of phase offsets, the benefits of which are described above.

Figure 7:
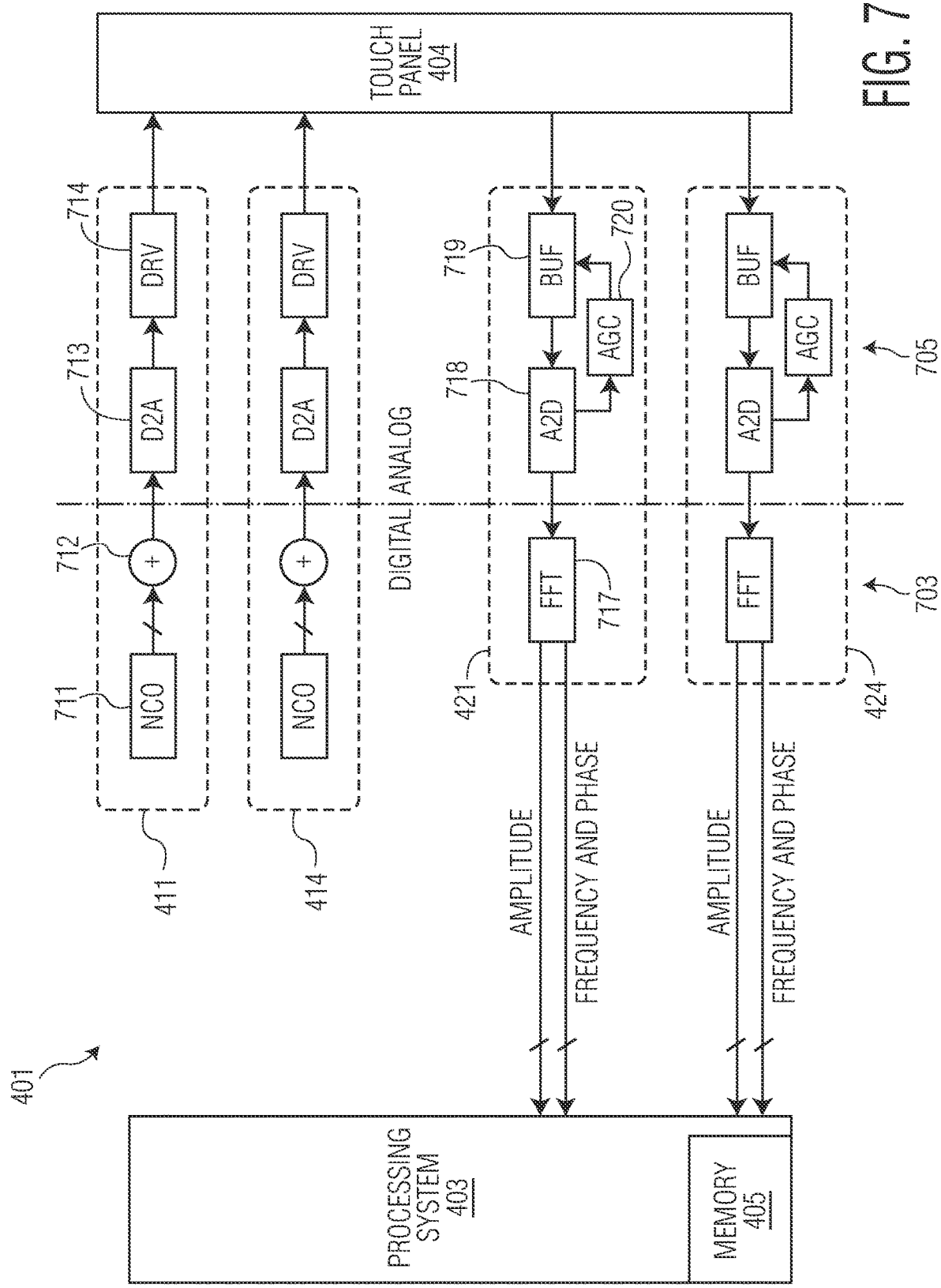
FIG. 7 is a block diagram of portions of a touch panel system according to one embodiment of the present invention.

FIG. 7 is a block diagram of touch panel system 401 showing further details of a driver (411, 414) and a sensor (421, 424) according to one embodiment. Driver 411 includes a numerically controlled oscillator (NCO) 711 that generates digital wave data for each frequency signal component (e.g., at FSELF, F1, F2, and FN) applied to its corresponding row electrode of panel 404. The digital values of each frequency signal component generated by NCO 711 for each time instance of the detection signal are added at summer 712. The output of summer 712 is converted to an analog signal by digital to analog (D2A) convertor 713. Drive circuitry 714 amplifies the analog signal to a desired voltage amplitude to produce the detection signal provided on the respective electrode (431 in FIG. 4) of panel 404.

In one embodiment, the digital signals for each frequency signal component with appropriate phase offset that are applied to the respective electrodes are "hardwired" in the NCO (711) of the driver. In one embodiment, the digital values for each signal component are stored in a table (not shown) in the NCO. In other embodiments, indications of the desired frequencies and phase offsets of the detection signals are set by processing system 403, such that the frequency signal components can be changed. In some embodiments, a driver (411) may include other devices (not shown) such as a frequency divider for running the NCO at a lower clock rate, filters, drive voltage supply lines, and clock inputs. The other drivers of panel system 401 have a similar configuration.

Sensor 421 includes a sensor buffer 719, analog to digital (A2D) converter 718, automatic gain control (AGC) 720, and Fast Fourier Transform (FFT) circuit 717. Sensor buffer 719 buffers sense signal values from a column electrode (426 in FIG. 4) which are then converted to digital signals by analog to digital converter 718. Sensor 421 includes an automatic gain control (AGC) 720 used to control the gain of the buffer 719 output for improving accuracy of the analog to digital conversion.

Fourier transform circuit 717 performs a Fast Fourier transform on the digital data to produce amplitude data and phase offset data of the sensed signal at the frequencies of the frequency signal components including amplitude data and phase offset data of the summed vector at each frequency. Circuit 717 also produces amplitude data at the common frequency signal component (FSELF) for self-capacitance determination. In one embodiment, circuit 717 sequentially provides the amplitude data (AMPLITUDE) and frequency-phase offset data (as indicated by FREQUENCY AND PHASE). In other embodiments, sensor 421 includes other devices and/or may have other configurations. For example, in some embodiments, a sensor may include filters (e.g., analog filters or digital filters not shown) for filtering the sense signals.

Processing system 403 utilizes the amplitude data and phase offset data produced by circuit 717 to determine the touch locations on panel 404. In some embodiments, at least portions of the Fast Fourier transform operations are performed by processing system 403. In other embodiments, each sensor (421, 424) would include a processing circuit (not shown) to determine the touch locations of the crosspoints of the sense electrode, where the processing circuit would output an indication of the touched locations located along the sense electrode to the processing system.

As shown in FIG. 7, part of drivers 411 and 414 are implemented in digital circuitry (NCO 711 and summer 712) and part in analog circuitry (D2A converter 713 and drive circuitry 714). Also, part of sensors 421 and 424 are implemented in digital circuitry (FFT circuit 717) and part in analog circuitry (A2D 718, AGC 720, and buffer 719). In one embodiment, the portions 705 of the drivers and sensors in analog circuitry are implemented with an analog integrated circuit (IC) (not shown) and the portions 703 in the digital circuitry are implemented with a digital IC (not shown), such as an ASIC. However, in other embodiments, portions 703 and 705 would be implemented on a single IC. In some embodiments, each driver and sensor would be implemented on its own IC. In still other embodiments, the drivers, sensors, and processing system 403 would be implemented in one integrated circuit.

In other embodiments, a touch panel system would have other configurations. For example, in some embodiments, system 401 would include separate NCOs for producing each frequency signal component. The output of each NCO would then be provided to the drivers that transmit the frequency signal component produced by the NCO.

Figure 8:
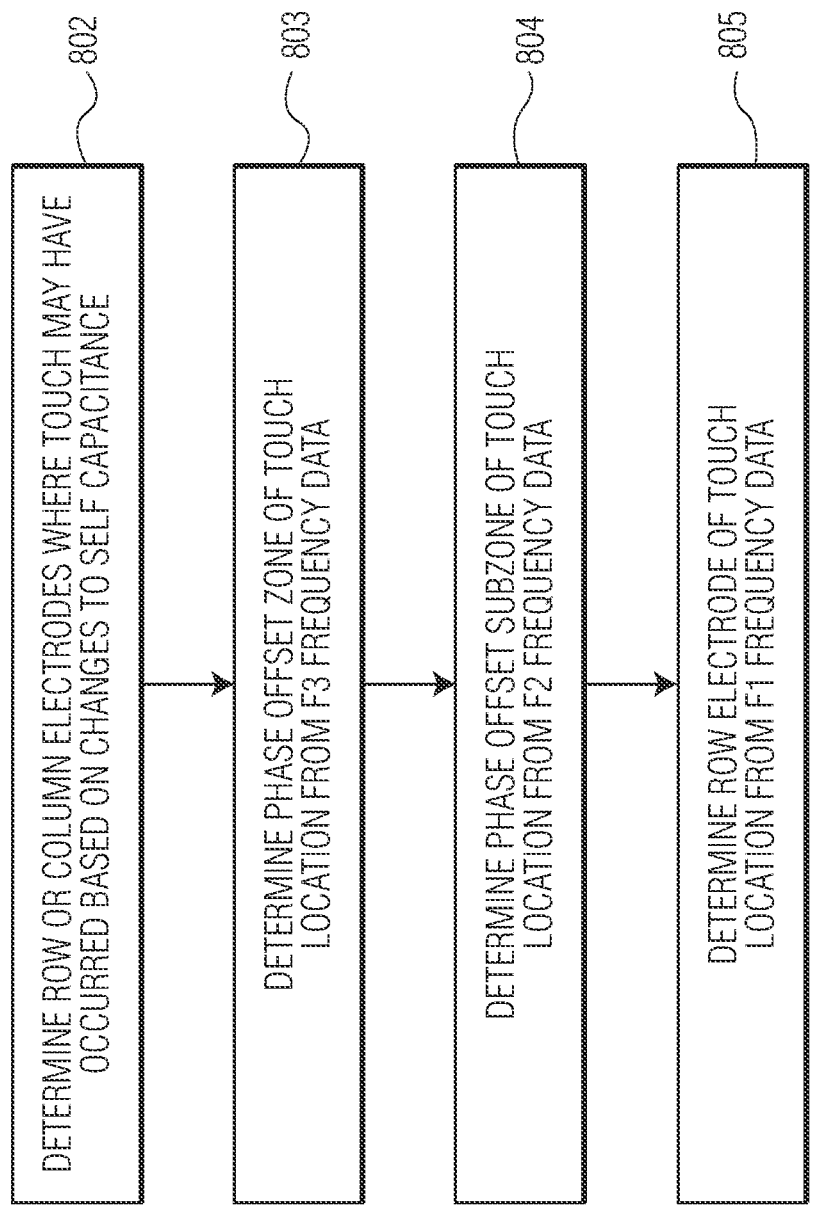
FIG. 8 is a flow diagram illustrating portions of a method for determining a touch location of a touch panel according to one embodiment of the present invention.

FIG. 8 is a flow chart illustrating a method for determining touch locations based on the amplitudes received from the Fast Fourier transform circuits (717) of the drivers according one embodiment. In one embodiment, the method of FIG. 8 is performed by processing system 403.

In operation 802, system 403 of FIG. 7 determines which rows and/or columns electrodes have been touched based on changes to the self-capacitance of each electrode. In one embodiment, the sensors for each column electrode and row electrode may include a simplified self-capacitance measuring circuit (not shown) that provide a signal indicative of a change in self-capacitance on that electrode to processing system 403 indicating that the electrode has been touched. Based upon these indications, processing system 403 then focuses on the data of the row and column electrodes that having touch events.

In operation 803, system 403 then examines the amplitude phase offset data from FFT circuits relating to the F3 frequency signal components of the column electrodes being touched to determine the phase offset zone begin touched. For example, referring to table 603 of FIG. 6, by analyzing the amplitude and phase offset of the summed vector at the F3 frequency for the column electrode being touched, a determination can be made whether the touch occurred in the 0 degree phase offset zone (rows 1-9), the 120 degree phase offset zone (rows 10-18), or in the 240 degree phase offset zone (rows 19-27).

In operation 804 of FIG. 8, system 403 next looks at the F2 signal components of the column electrode being touched to determine the phase offset subzone being touched of the phase offset zone being touched as determined in operation 803. By analyzing the amplitude and phase offset data of the F2 frequency components for the column electrode being touched, a determination can be made whether the touch occurred in the 0 degree phase offset subzone, the 120 degree phase offset subzone, or in the 240 degree phase offset subzone. Regarding table 603, the 0 degree phase offset subzone of the 0 degree phase offset zone (rows 1-9) corresponds to rows 1-3, the 120 degree phase offset subzone of the 0 degree phase offset zone corresponds to rows 4-6, and the 240 degree phase offset subzone of the 0 degree phase offset zone corresponds to rows 7-9.

In operation 805, system 403 examines the F1 signal component data for the column electrode being touched to determine the row location being touched of the phase offset subzone being touched as determined in operation 804. If in operation 802, the touch was determined to be in the 0 degree phase offset zone (rows 1-9), and in operation 803, the touch was determined to be in the 120 degrees phase offset subzone (rows 4-6), then in operation 805, the F1 signal data is used to determine which of rows 4-6 were touched.

Using the above method for determining a touch location may reduce the computational time in determining a touch location by systematically narrowing down the possibilities of the touch location to reduce the amount of data being examined by system 403.

Processing system may utilize other methods for determine touch location from amplitude-phase offset information for each frequency. In some embodiments, a signal profile touch location table (not shown) is stored in memory 405. The table would include all possible touch location probabilities and their corresponding summed vector amplitude-phase offset profile for each frequency. The amplitude-phase offset data for each frequency from a sensor 421 would be used as a key to look up the touch locations based on the profile in the table that matches the sensed data.

Afterwards, processing system 403 would initiate appropriate actions (e.g., change displays, turn on or off indicated systems) based on the indications of the touch locations.

In some embodiments, a touch panel would include a second set of drive electrodes (not shown) that utilize at least some of the same unique frequency phase offset combinations that are driven on the first set of drive electrodes (e.g., rows electrodes 431-434). This second set of electrodes would be at locations away from the first set of electrodes by a distance that would be difficult to touch with one hand.

As shown herein, providing a touch pad system that utilizes detection signals with unique frequency-phase offset combinations for touch location detection may provide for a system that utilizes a smaller frequency band for touch location detection. Such a feature may be advantageous for relatively large touch panels where additional electrodes may lower the useable frequency band for touch panel detection.

Features described herein with respect to one embodiment may be implemented in other embodiments described herein.

In one embodiment, a touch pad system includes a touchpad including a first plurality of electrodes and a second plurality of electrodes, wherein the first plurality of electrodes and the second plurality of electrodes define a plurality of crosspoints where each crosspoint of the plurality of crosspoints is defined by an electrode of the first plurality of electrodes and an electrode of the second plurality of electrodes. The touch pad system includes a plurality of drivers, each driver of the plurality of drivers is configured to drive a detection signal on a respective electrode of the first plurality of electrodes during a touch location detection mode. The touch pad system includes a plurality of sensors, each sensor of the plurality of sensors configured to sense a sense signal on a respective electrode of the second plurality of electrodes. During the touch location detection mode, a sense signal on an electrode of the second plurality of electrodes is dependent upon the detection signals driven by the drivers of the plurality of drivers on the first plurality of electrodes that define crosspoints of the plurality of crosspoints corresponding to the electrode of the second plurality of electrodes. During the touch location detection mode, each driver of the plurality of drivers drives on its respective electrode of the first plurality of electrodes a detection signal that includes one or more frequency signal components with each frequency signal component having a frequency and a phase offset and where each frequency signal component of the one or more frequency signal components has a different frequency. The detection signal driven on each electrode of the first plurality of electrodes has a frequency and phase offset combination of the one or more frequency signal components of the detection signal that is unique to all of the other detection signals driven the other electrodes of the first plurality of electrodes. The detection signals driven on the first plurality of electrodes include at least three different phase offsets for at least one frequency. During a touch location detection mode, information of a sense signal on an electrode of the second plurality of electrodes detected by a respective sensor of the plurality of sensors is utilized to determine locations of touch events at crosspoints corresponding to the electrode of second plurality of electrodes.

In a further embodiment of the system, each detection signal of the detection signals driven on the first plurality of electrodes includes two or more frequency component signals with each of the two or more frequency component signals having a different frequency.

In a further embodiment of the system, wherein the detection signals driven on the first plurality of electrodes include at least three different phase offsets for at least two frequencies.

In a further embodiment of the system, the frequency signal components of each detection signal driven on each electrode of the first plurality of electrodes have the same combination of different frequencies.

In a further embodiment of the system, each detection signal of the detection signals driven on the first plurality of electrodes includes three or more frequency component signals with each of the three or more frequency component signals having a different frequency.

In a further embodiment of the system, the detection signals driven on the first plurality of electrodes include an odd number of different phase offsets for at least one frequency.

In a further embodiment of the system, the frequency signal components of the one or more frequency signal components of the detection signals driven on the first plurality of electrodes are characterized as signal tones.

In a further embodiment of the system, wherein during a touch location detection mode, touch locations are determined from amplitude information of the sense signals of the second plurality of electrodes at phase offsets of frequencies of the one or more frequency signal components.

In a further embodiment of the system, each sensor of the plurality of sensors includes a Fast Fourier transform circuit for determining the amplitude information.

In a further embodiment of the system, for at least some frequencies of the detection signals driven on the first plurality of electrodes, a summed vector at the frequency has a minimum amplitude below a threshold for a sensed signal on an electrode of the second plurality of electrodes in response to a no touch condition during a touch location detection mode of any crosspoint of the plurality of crosspoints located along the electrode of the second plurality of electrodes.

In a further embodiment of the system, wherein the plurality of sensors detects changes in the sense signals of the second plurality of electrodes indicative of changes to mutual capacitance between an electrode of the first plurality of electrodes and an electrode of the second plurality of electrodes due to a touch event at a crosspoint of the electrode of the first plurality of electrodes and an electrode of the second plurality of electrodes.

In another embodiment, a method for determining touch locations on a touch panel includes driving a plurality of detection signals on a first plurality of electrodes, where each detection signal is driven on a respective electrode of the first plurality of electrodes. Each detection signal of the plurality of detection signals includes one or more frequency signal components with each frequency signal component having a frequency and a phase offset and where each frequency signal component of the one or more frequency signal components of a detection signal has a different frequency. The detection signal driven on each respective electrode of the first plurality of electrodes has a frequency-phase offset combination of the one or more frequency signal components that is unique to all other detection signals of the plurality of detection signals driven on the other electrodes of the first plurality of electrodes. The plurality of detection signals driven on the first plurality of electrodes include at least three different phase offsets for at least one frequency. The method includes sensing sense signals on a second plurality of electrodes. The first plurality of electrodes and the second plurality of electrodes define a plurality of crosspoints. Each crosspoint of the plurality of crosspoints is defined by an electrode of the first plurality of electrodes and an electrode of the second plurality of electrodes. The method includes determining one or more touch locations at crosspoints of the plurality of crosspoints based on characteristics of the sense signals based on the sensing.

In a further embodiment of the method, the plurality of detection signals driven on the first plurality of electrodes includes an odd number of different phase offsets for at least one frequency.

In a further embodiment of the method, each frequency signal component of the one or more frequency signal components are characterized as signal tones.

In a further embodiment of the method, the determining one or more touch locations includes determining based on amplitude information of the sense signals of the second plurality of electrodes at phase offsets of frequencies of the one or more frequency signal components.

In a further embodiment of the method, the detection signals of the plurality of detection signals includes two or more frequency component signals with each of the two or more frequency component signals having a different frequency.

In a further embodiment of the method, the frequency signal components of each detection signal of the plurality of detection signals driven on each electrode of the first plurality of electrodes have the same combination of frequencies.

In a further embodiment of the method, wherein the determining one or more touch locations includes performing Fast Fourier transform operations on data of the sense signals to generate amplitude information.

In a further embodiment of the method, for at least some frequencies of the plurality of detection signals, an amplitude of a summed vector at the frequency is below a minimum threshold in a sensed signal on an electrode of the second plurality of electrodes in response to a no touch condition of any crosspoint of the plurality of crosspoints located along the electrode of the second plurality of electrodes.

In a further embodiment of the method, the determining one or more touch locations at crosspoints of the plurality of crosspoints based on characteristics of the sense signals includes determining changes in sense signal characteristics based on changes to mutual capacitance between an electrode of the first plurality of electrodes and an electrode of the second plurality of electrodes due to a touch event at a crosspoint of the plurality of crosspoints.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

The invention claimed is:

1. A touch pad system, comprising:
    a touchpad including a first plurality of electrodes and a second plurality of electrodes, wherein the first plurality of electrodes and the second plurality of electrodes define a plurality of crosspoints where each crosspoint of the plurality of crosspoints is defined by an electrode of the first plurality of electrodes and an electrode of the second plurality of electrodes;
    a plurality of drivers, each driver of the plurality of drivers is configured to drive a detection signal on a respective electrode of the first plurality of electrodes during a touch location detection mode;
    a plurality of sensors, each sensor of the plurality of sensors configured to sense a sense signal on a respective electrode of the second plurality of electrodes, wherein during the touch location detection mode, a sense signal on an electrode of the second plurality of electrodes is dependent upon the detection signals driven by the drivers of the plurality of drivers on the first plurality of electrodes that define crosspoints of the plurality of crosspoints corresponding to the electrode of the second plurality of electrodes;
    wherein during the touch location detection mode, each driver of the plurality of drivers drives on its respective electrode of the first plurality of electrodes a detection signal that includes one or more frequency signal components with each frequency signal component having a frequency and a phase offset and where each frequency signal component of the one or more frequency signal components has a different frequency, wherein the detection signal driven on each electrode of the first plurality of electrodes has a frequency and phase offset combination of the one or more frequency signal components of the detection signal that is unique to all of the other detection signals driven the other electrodes of the first plurality of electrodes, wherein the detection signals driven on the first plurality of electrodes include at least three different phase offsets for at least one frequency;
    wherein during a touch location detection mode, information of a sense signal on an electrode of the second plurality of electrodes detected by a respective sensor of the plurality of sensors is utilized to determine locations of touch events at crosspoints corresponding to the electrode of second plurality of electrodes.

2. The system of claim 1 wherein each detection signal of the detection signals driven on the first plurality of electrodes includes two or more frequency component signals with each of the two or more frequency component signals having a different frequency.

3. The system of claim 2 wherein the detection signals driven on the first plurality of electrodes include at least three different phase offsets for at least two frequencies.

4. The system of claim 2 wherein the frequency signal components of each detection signal driven on each electrode of the first plurality of electrodes have the same combination of different frequencies.

5. The system of claim 1 wherein each detection signal of the detection signals driven on the first plurality of electrodes includes three or more frequency component signals with each of the three or more frequency component signals having a different frequency.

6. The system of claim 1 wherein the detection signals driven on the first plurality of electrodes include an odd number of different phase offsets for at least one frequency.

7. The system of claim 1 wherein the frequency signal components of the one or more frequency signal components of the detection signals driven on the first plurality of electrodes are characterized as signal tones.

8. The system of claim 1 wherein during a touch location detection mode, touch locations are determined from amplitude information of the sense signals of the second plurality of electrodes at phase offsets of frequencies of the one or more frequency signal components.

9. The system of claim 8 wherein each sensor of the plurality of sensors includes a Fast Fourier transform circuit for determining the amplitude information.

10. The system of claim 1 wherein, for at least some frequencies of the detection signals driven on the first plurality of electrodes, a summed vector at the frequency has a minimum amplitude below a threshold for a sensed signal on an electrode of the second plurality of electrodes in response to a no touch condition during a touch location detection mode of any crosspoint of the plurality of crosspoints located along the electrode of the second plurality of electrodes.

11. The system of claim 1 wherein the plurality of sensors detects changes in the sense signals of the second plurality of electrodes indicative of changes to mutual capacitance between an electrode of the first plurality of electrodes and an electrode of the second plurality of electrodes due to a touch event at a crosspoint of the electrode of the first plurality of electrodes and an electrode of the second plurality of electrodes.

12. A method for determining touch locations on a touch panel, the method comprising:
    driving a plurality of detection signals on a first plurality of electrodes, where each detection signal is driven on a respective electrode of the first plurality of electrodes, wherein each detection signal of the plurality of detection signals includes one or more frequency signal components with each frequency signal component having a frequency and a phase offset and where each frequency signal component of the one or more frequency signal components of a detection signal has a different frequency, wherein the detection signal driven on each respective electrode of the first plurality of electrodes has a frequency-phase offset combination of the one or more frequency signal components that is unique to all other detection signals of the plurality of detection signals driven on the other electrodes of the first plurality of electrodes, wherein the plurality of detection signals driven on the first plurality of electrodes include at least three different phase offsets for at least one frequency;

sensing sense signals on a second plurality of electrodes, wherein the first plurality of electrodes and the second plurality of electrodes define a plurality of crosspoints, wherein each crosspoint of the plurality of crosspoints is defined by an electrode of the first plurality of electrodes and an electrode of the second plurality of electrodes;

determining one or more touch locations at crosspoints of the plurality of crosspoints based on characteristics of the sense signals based on the sensing.

13. The method of claim 12 wherein the plurality of detection signals driven on the first plurality of electrodes includes an odd number of different phase offsets for at least one frequency.

14. The method of claim 12 wherein each frequency signal component of the one or more frequency signal components are characterized as signal tones.

15. The method of claim 12 wherein the determining one or more touch locations includes determining based on amplitude information of the sense signals of the second plurality of electrodes at phase offsets of frequencies of the one or more frequency signal components.

16. The method of claim 12 wherein the detection signals of the plurality of detection signals includes two or more frequency component signals with each of the two or more frequency component signals having a different frequency.

17. The method of claim 16 wherein the frequency signal components of each detection signal of the plurality of detection signals driven on each electrode of the first plurality of electrodes have a same combination of frequencies.

18. The method of claim 12 wherein the determining one or more touch locations includes performing Fast Fourier transform operations on data of the sense signals to generate amplitude information.

19. The method of claim 12 wherein for at least some frequencies of the plurality of detection signals, an amplitude of a summed vector at the frequency is below a minimum threshold in a sensed signal on an electrode of the second plurality of electrodes in response to a no touch condition of any crosspoint of the plurality of crosspoints located along the electrode of the second plurality of electrodes.

20. The method of claim 12 wherein the determining one or more touch locations at crosspoints of the plurality of crosspoints based on characteristics of the sense signals includes determining changes in sense signal characteristics based on changes to mutual capacitance between an electrode of the first plurality of electrodes and an electrode of the second plurality of electrodes due to a touch event at a crosspoint of the plurality of crosspoints.

* * * * *